United States Patent
Kleine

[19]

[11] Patent Number: 5,941,942
[45] Date of Patent: Aug. 24, 1999

[54] METHOD FOR MULTIPLYING A MULTIPLICAND AND A MULTIPLIER ACCORDING TO THE BOOTH METHOD IN INTERACTIVE STEPS

[75] Inventor: Ulrich Kleine, Helmstedt, Germany

[73] Assignee: Siemens Aktiengesellschaft, Munich, Germany

[21] Appl. No.: 08/907,527

[22] Filed: Aug. 8, 1997

[30] Foreign Application Priority Data

Aug. 9, 1996 [DE] Germany .................... 196 32 246

[51] Int. Cl.⁶ .................................................. G06F 7/52
[52] U.S. Cl. ................................. 708/632; 708/628
[58] Field of Search ................ 364/760.05, 760.04, 364/760.03, 760.02, 760.01

[56] References Cited

U.S. PATENT DOCUMENTS

| | | | |
|---|---|---|---|
| 4,807,175 | 2/1989 | Tokumaru et al. | 364/760.05 |
| 5,220,525 | 6/1993 | Anderson et al. | 364/760.05 |
| 5,226,003 | 7/1993 | Nagamatsu | 364/760.05 |
| 5,457,804 | 10/1995 | Ohtomo | 395/800 |

OTHER PUBLICATIONS

Proceedings of the IRE, O.L. MacSorley, High–Speed Arithmetic in Binary Computers, vol. 49, pp. 67–91.

IEEE Transactions on Computers, Oct. 1975, L.P. Rubinfield, A Proof of the Modified Booth's Algorithm for Multiplication, pp. 1014–1015.

Proceedings of ISCAS, 1985, Anton Stölzle et al, Parallel–Serial Multiplication Using Booth's Algorithm and Horner's Scheme, pp. 1389–1390.

Primary Examiner—David H. Malzahn
Attorney, Agent, or Firm—Hill & Simpson

[57] ABSTRACT

In a modified Booth's algorithm only one shift unit is required for multiplication of the partial products. This is based on the known coding prescriptions of the Booth's algorithm, which respectively determines from 3 bits of the multiplier how the partial products are to be produced. From the respective 3 bits of the multiplier of the current iteration and of the preceding iteration, it is determined whether the partial product used for the next iteration has to be multiplied by ½, ¼ or ⅛. For this purpose, a coding table and a multiplier that operates according to this principle are provided.

4 Claims, 4 Drawing Sheets

METHOD FOR MULTIPLYING A MULTIPLICAND AND A MULTIPLIER ACCORDING TO THE BOOTH METHOD IN INTERACTIVE STEPS

BACKGROUND OF THE INVENTION

U.S. Pat. No. 5,457,804 discloses a multiplication circuit in which multiplication time for multiplications with doubled precision is shortened, whereby either a higher-value half or a lower-value half of an input word of the multiplication circuit is selectively supplied to a standard Booth decoder via a multiplexer.

There are many algorithms for the accelerated calculation of a multiplication. In the classical Booth's algorithm, two bits of the multiplier are always simultaneously viewed, and a factor is formed therefrom by which the multiplicand is multiplied. This product is respectively added to the partial product. This method works with n uniform shift operations by a bit position to the right (division by 2) and n/2 additions, where n is the word length of the multiplier. For two's complement representations, no sign corrections are required.

A faster modified method has been proposed in (O. L. MacSorley, High-speed arithmetic in binary computers, Proc. IRE, vol. 49, pp. 67–91, 1961; L. P. Rubinfield, A proof of the modified Booth's algorithm for multiplication, IEEE Trans. Computers, pp. 1014–1015, October 1975). In this method, three bits of the multiplier are viewed simultaneously, which are decoded into 5 different factors (0; +−1; +−2; see Table 1). This algorithm requires only n/2 shift operations by two bit positions to the right (division by 4) and n/2 additions. In both methods mentioned, the decoding can be begun either at the LSB (least significant bit) or at the MSB (most significant bit). A special treatment of the sign is not required. The decoding beginning with the LSB has the advantage (A. Stötzle, A. Rainer and W. Ulbrich, Parallel-serial multiplication using Booth's algorithm and Horner scheme, Proc. ISCAS '85, pp. 1389–1390, May 1985) that via the use of the Horner scheme the word length of the product is limited to the word length of the multiplicand. The result thus obtained agrees with the first m bit of the exactly n+n bit long product. In the following, the modified Booth's algorithm is specified somewhat more precisely, since it is the point of departure for the invention.

Let the multiplier Y and the multiplicand X be given by their two's complement representation.

$$Y = -y_0 + \sum_{i=1}^{n-1} y_i 2^{-i} \tag{1}$$

$$X = -x_0 + \sum_{j=1}^{m-1} x_j 2^{-j} \tag{2}$$

with $y_i \in \{0,1\}$ for $i=0, 1, 2, \ldots, n-1$ and $x_j \in \{0, 1\}$, for $j=0, 1, 2, \ldots, m-1$ By means of the combination of two successive summation steps, the multiplier Y can be transformed into $$Y = \sum_{i=1}^{n-1} (y_{i+1} + y_i - 2y_{i-1}) 2^{-i}, \tag{3}$$

for $i=1, 3, 5, \ldots, n-1$ and $y_n=0$.

The product of the multiplication P thus results with the multiplicand X, as $$P = XY = \sum_{i=1}^{n-1} \{X(y_{i+1} + y_i - 2y_{i-1})2^{-i}\} \tag{4}$$

for $I=1, 3, 5, \ldots, n-1$, with $y_n=0$
and with $$z_i = y_{i+1} + y_i - 2y_{i-1} \tag{5}$$

$$p = \sum_{i=1}^{n-1} X z_i 2^{-i} \tag{6}$$

for $i=1, 3, 5, \ldots, n-1$

FIG. 1 shows the processing in principle of the multiplier X with the modified Booth decoder. Beginning at the LSB side, three bits are always decoded simultaneously, and subsequently the decoding window is shifted two bit positions to the left. The bit $y_n$ is set to 0, and if the word length n is odd, an additional bit is produced by the doubling of the multiplier MSB. The corresponding decoder table can be seen in Table 1. This does not require further explanation, since it results from (A. Stötzle, A. Rainer and W. Ulbrich, Parallel-serial multiplication using Booth's algorithm and scheme, Proc. ISCAS '85, pp. 1389–1390, May 1985).

TABLE 1

| | Multiplier bits (Y) | | |
|---|---|---|---|
| $Y_{i-1}$ | $Y_i$ | $Y_{i+1}$ | Operation |
| 0 | 0 | 0 | $PP_i \leftarrow 0.25PP_{i+2}$ |
| 0 | 0 | 1 | $PP_i \leftarrow 0.25PP_{i+2+X}$ |
| 0 | 1 | 0 | $PP_i \leftarrow 0.25PP_{i+2+X}$ |
| 0 | 1 | 1 | $PP_i \leftarrow 0.25PP_{i+2+2X}$ |
| 1 | 0 | 0 | $PP_i \leftarrow 0.25PP_{i+2-2X}$ |
| 1 | 0 | 1 | $PP_i \leftarrow 0.25PP_{i+2-X}$ |
| 1 | 1 | 0 | $PP_i \leftarrow 0.25PP_{i+2-X}$ |
| 1 | 1 | 1 | $PP_i \leftarrow 0.25PP_{i+2}$ |

Corresponding to the coding prescriptions of Table 1, control signals are produced, namely the factor signal C, the shift signal $K_0$ and the sign signal $S_i$. The control signals control the concrete execution of the individual cycles of the multiplication. FIG. 2 shows a schematic diagram of a standard Booth multiplier architecture. At the beginning of a multiplication, the multiplicand X is first loaded into the register REGX, and the accumulation register ACCU is set to 0 and initialized. Corresponding to the value of the multiplier Y and to the corresponding result of the Booth decoding according to Table 1, the individual partial products are produced in n/2 steps according to Equation 6. For this purpose, the multiplicand X must be multiplied by 0, 1 or 2 in each iteration. The shift unit SHE1 in FIG. 2 serves for this purpose. The multiplication by the factor of 2 means that an operation of shifting the multiplicand to the left by one bit position must be carried out. The partial product PP is calculated in each iteration using a shift unit SHE2 that divides the partial product of the preceding iteration by 4 (shift to the right by two bit positions). After n/2 iterations, the product is available in the accumulation register ACCU. Care is to be taken that the multiplicand X must have a doubled MSB, so that no overflow can occur during the execution of the additions or subtractions. Using the multiplier according to FIG. 2, the equations indicated in Table 1 under the heading 'Operation' are thus realized. The factor signal C is used to let the multiplicand X through to the shift unit SHE1 or to set 0. An operation of this sort is required according to the first and the last lines of Table 1. A multiplication by 2 is required for the multiplicand X according to Table 1, in the $4^{th}$ and $5^{th}$ lines. The addition or, respectively, subtraction ensues in an arithmetic logic unit ALU, dependent on the sign signal $S_i$. From the last column of Table 1, it can be seen when the multiplicand X must be added to or subtracted from the preceding partial product $PP_{i+2}$. The partial product $PP_{i+2}$ is in the accumulation register ACCU and is multiplied by 0.25 in the shift unit SHE2, and is then supplied again for the formation of the next partial product $PP_i$ of the ALU. The allocation of the multiplier bits $y_{i-1}$, $y_i$, $y_{i+1}$ to the individual operations can be found in Table 1.

SUMMARY OF THE INVENTION

It is an object of the present invention to modify the above-described Booth's algorithm in order to achieve a simplification of the multiplier.

A further object is to indicate a Booth multiplier that operates according to the modified Booth's algorithm.

Finally, the object is to indicate a decoding circuit with which the control signals for the multiplier are produced.

In general terms the present invention is a method for a multiplication circuit for multiplication of a multiplicand and a multiplier according to the Booth method in iterative steps.

Beginning with the least significant bit, three multiplier bits are respectively decoded, and a partial product is formed iteratively, dependent on the decoding result, from the previous partial product and from the multiplicand, whereby the partial product is set to 0 at the beginning.

In the respective next iteration, the decoding window is subsequently shifted to the left by two bits via the multiplier.

In order to obtain a first intermediate result dependent on a factor signal obtained from the bits to be decoded, the multiplicand is multiplied by 0 or 1.

The first intermediate result and a second intermediate result obtained from the partial product of the preceding iteration are added or subtracted dependent on a sign signal obtained from the bits to be decoded.

In order to obtain the second intermediate result dependent on two control signals produced from the bit to be decoded of the current iteration and from the bit to be decoded of the preceding iteration of the multiplier, the partial product of the preceding iteration is multiplied by ½, ¼ or ⅛.

A multiplication by ¼ ensues if the decoding result of the current iteration yields the result that the multiplicand is combined in simple form with the preceding partial product.

A multiplication by ⅛ ensues if the decoding result of the current iteration yields the result that the multiplicand is combined in duplicate form with the preceding partial product.

A multiplication by ½ ensues if the decoding result of the preceding iteration yields the result that the multiplicand was to be combined in duplicate form.

The present invention is also a multiplier circuit for carrying out the method. A multiplicand register is provided that stores the multiplicand. A multiplier is provided at the output of the multiplicand register, which multiplier multiplies the multiplicand by 0 or 1, dependent on the factor signal. An arithmetic logic unit is provided, which, dependent on the sign signal, adds or subtracts the result emitted at the output of the multiplier to the second intermediate result present at the other output. An accumulation register is arranged at the output of the arithmetic logic unit. A shift unit is provided at the output of the accumulation register, with which the content of the accumulation register is multiplied by ½, ¼ or ⅛, dependent on the control signals, in order to produce the second intermediate result. The output of the shift unit is connected with the arithmetic logic unit.

In a further embodiment a decoding circuit is provided for the production of the control signals of the factor signal and of the sign signal. The decoding circuit has: a latch memory for storing the multiplier; multiplexers connected to the output of the latch memory, which select at the output the bits of the decoding window from the multiplier bits; a decoder that produces the control signals from the bits of the decoding window.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 2:
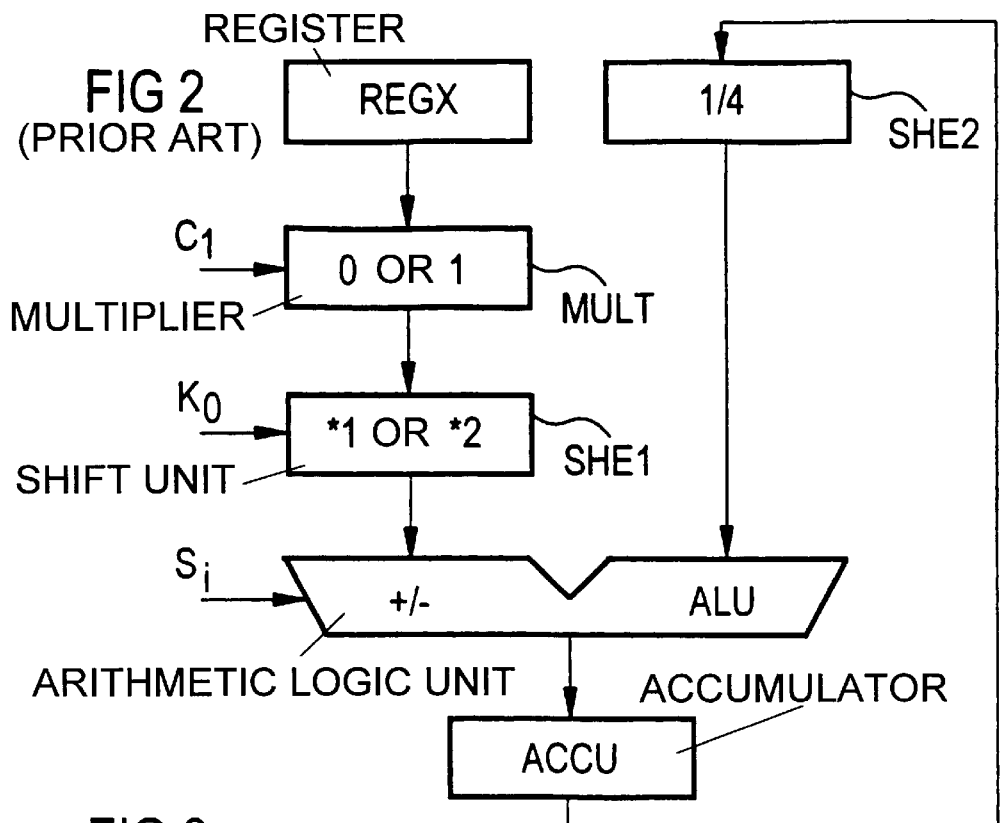
FIG. 2 shows the known Booth multiplier.
Figure 3:
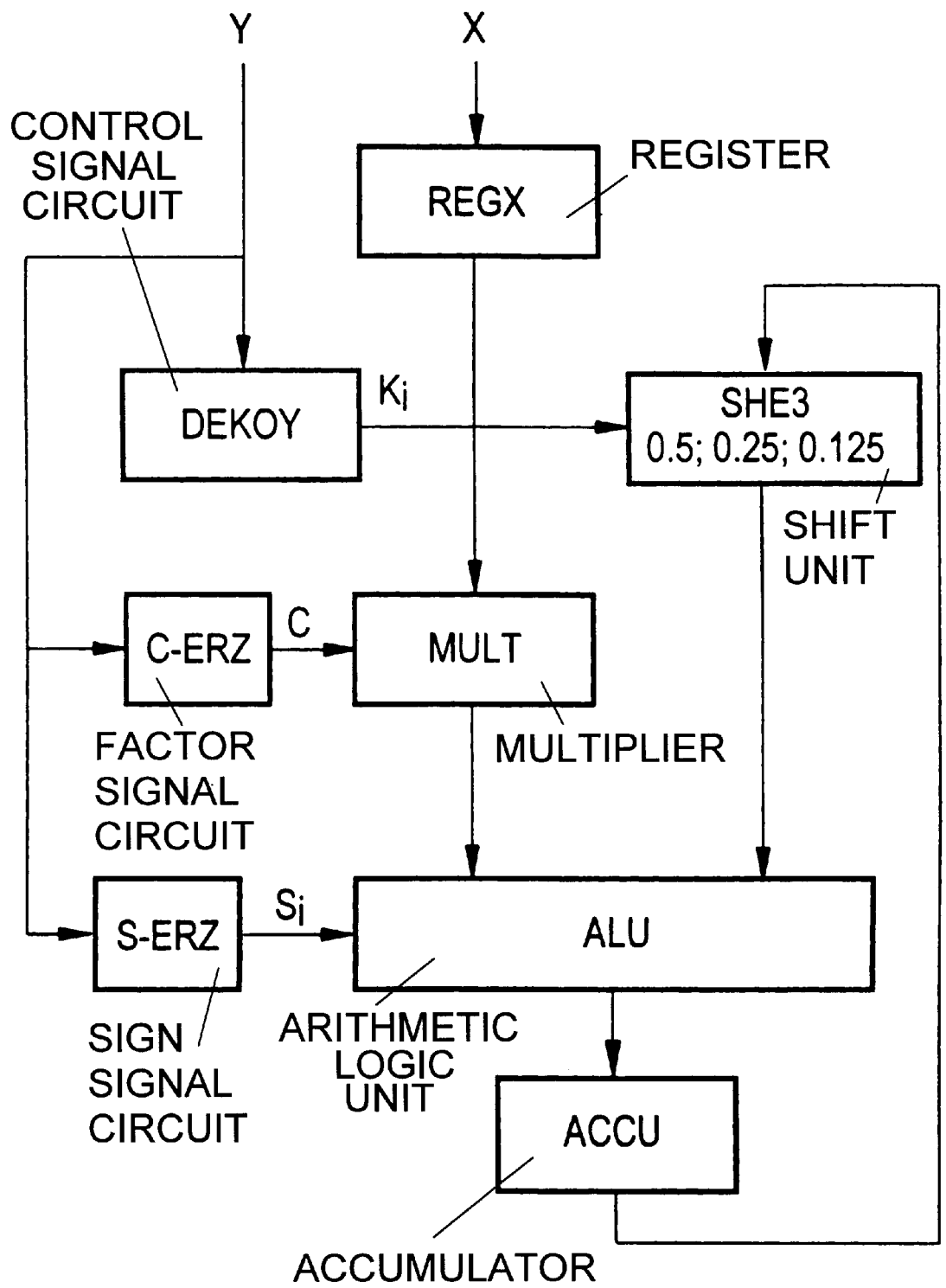
FIG. 3 shows a schematic diagram of the modified Booth multiplier.

The schematic diagram according to FIG. 3 shows, in comparison to the schematic diagram of FIG. 2, that there is no longer a shift unit SHE in the left branch of the ALU. In this left branch, only a multiplication by 0 or 1 and a change of sign is still executed. However, for this purpose a variable right-shift operation is executed in the accumulator loop (right ALU branch). The remaining construction of the multiplier according to FIG. 3 corresponds to that of the multiplier according to FIG. 2.

The multiplicand X is stored in the register REGX. This multiplicand is either passed or set to 0 via the unit MULT, which is driven by the factor signal C. For this purpose, the factor signal C is produced from the multiplier signal Y in a circuit C-ERZ, corresponding to the operations of Table 1.

TABLE 2

| Multiplier bits Y | | | | | | | | | | |
|---|---|---|---|---|---|---|---|---|---|---|
| $y_{i-1}$ | $y_i$ | $y_{i+1}$ | $y_{i+2}$ | $y_{i+3}$ | $s_i$ | $c_i$ | $H_1$ | $H_2$ | $K_2$ | $K_1$ |
| 0 | 0 | 0 | 0 | 0 | 0 | 0 | 1 | 1 | 0 | 1 |
| 0 | 0 | 0 | 0 | 1 | 0 | 0 | 1 | 1 | 0 | 1 |
| 0 | 0 | 0 | 1 | 0 | 0 | 0 | 1 | 1 | 0 | 1 |
| 0 | 0 | 0 | 1 | 1 | 0 | 0 | 1 | 0 | 1 | 0 |
| 0 | 0 | 1 | 0 | 0 | 0 | 1 | 1 | 0 | 1 | 0 |
| 0 | 0 | 1 | 0 | 1 | 0 | 1 | 1 | 1 | 0 | 1 |

TABLE 2-continued

| | | | Multiplier bits Y | | | | | | | |
|---|---|---|---|---|---|---|---|---|---|---|
| $y_{i-1}$ | $y_i$ | $y_{i+1}$ | $y_{i+2}$ | $y_{i+3}$ | $s_i$ | $c_i$ | $H_1$ | $H_2$ | $K_2$ | $K_1$ |
| 0 | 0 | 1 | 1 | 0 | 0 | 1 | 1 | 1 | 0 | 1 |
| 0 | 0 | 1 | 1 | 1 | 0 | 1 | 1 | 1 | 0 | 1 |
| 0 | 1 | 0 | 0 | 0 | 0 | 1 | 1 | 1 | 0 | 1 |
| 0 | 1 | 0 | 0 | 1 | 0 | 1 | 1 | 1 | 0 | 1 |
| 0 | 1 | 0 | 1 | 0 | 0 | 1 | 1 | 1 | 0 | 1 |
| 0 | 1 | 0 | 1 | 1 | 0 | 1 | 1 | 0 | 1 | 0 |
| 0 | 1 | 1 | 0 | 0 | 0 | 1 | 0 | 0 | 0 | 1 |
| 0 | 1 | 1 | 0 | 1 | 0 | 1 | 0 | 1 | 1 | 1 |
| 0 | 1 | 1 | 1 | 0 | 0 | 1 | 0 | 1 | 1 | 1 |
| 0 | 1 | 1 | 1 | 1 | 0 | 1 | 0 | 1 | 1 | 1 |
| 1 | 0 | 0 | 0 | 0 | 1 | 1 | 0 | 1 | 1 | 1 |
| 1 | 0 | 0 | 0 | 1 | 1 | 1 | 0 | 1 | 1 | 1 |
| 1 | 0 | 0 | 1 | 0 | 1 | 1 | 0 | 1 | 1 | 1 |
| 1 | 0 | 0 | 1 | 1 | 1 | 1 | 0 | 0 | 0 | 1 |
| 1 | 0 | 1 | 0 | 0 | 1 | 1 | 1 | 0 | 1 | 0 |
| 1 | 0 | 1 | 0 | 1 | 1 | 1 | 1 | 1 | 0 | 1 |
| 1 | 0 | 1 | 1 | 0 | 1 | 1 | 1 | 1 | 0 | 1 |
| 1 | 0 | 1 | 1 | 1 | 1 | 1 | 1 | 1 | 0 | 1 |
| 1 | 1 | 0 | 0 | 0 | 1 | 1 | 1 | 1 | 0 | 1 |
| 1 | 1 | 0 | 0 | 1 | 1 | 1 | 1 | 1 | 0 | 1 |
| 1 | 1 | 0 | 1 | 0 | 1 | 1 | 1 | 1 | 0 | 1 |
| 1 | 1 | 0 | 1 | 1 | 1 | 1 | 1 | 0 | 1 | 0 |
| 1 | 1 | 1 | 0 | 0 | 1 | 0 | 1 | 0 | 1 | 0 |
| 1 | 1 | 1 | 0 | 1 | 1 | 0 | 1 | 1 | 0 | 1 |
| 1 | 1 | 1 | 1 | 0 | 1 | 0 | 1 | 1 | 0 | 1 |
| 1 | 1 | 1 | 1 | 1 | 1 | 0 | 1 | 1 | 0 | 1 |

The sign signal $S_i$ is likewise generated from the multiplier Y, in the circuit S-ERZ. The shifting of the partial product is carried out in the shift unit SHE3, whereby a multiplication by ½, ¼, or ⅛ is carried out by means of shifting to the right, corresponding to the operations to be executed.

Figure 1:
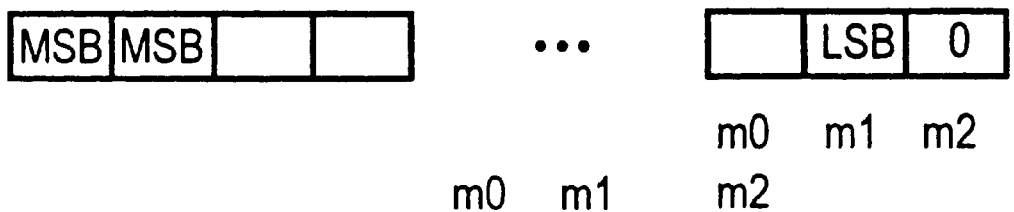
FIG. 1 shows the decoding window of the multiplier according to the known method.
Figure 4:
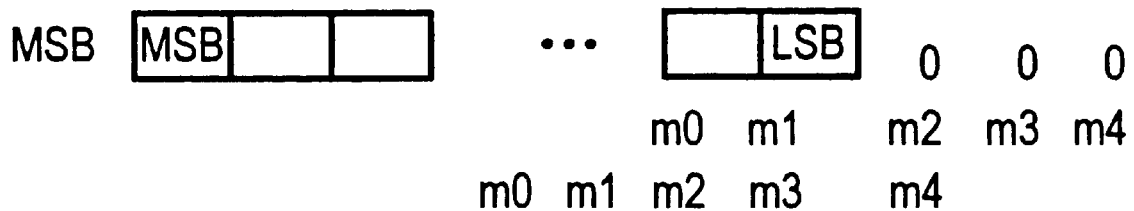
FIG. 4 shows the decoding window of the multiplier according to the modified Booth's algorithm.

Table 2 indicates a possible coding of the multiplier Y. As can be seen from Table 2, an expansion of the decoding size to 5 bits is necessary, as is also specified in the prior art (A. Stötzle, A. Rainer and W. Ulbrich, Parallel-serial multiplication using Booth's algorithm and Horner scheme, Proc. ISCAS '85, pp. 1389–1390, May 1985). The sign signal $S_i$ indicates whether the multiplicand X is added ($S_i$=0) or subtracted ($S_i$=1), the factor signal C indicates the factor with which the multiplicand X is weighted (C=1 multiplication by 1, C=1 multiplication by 0), and the control signals $K_1$ (right-shift operation by one bit position if $K_1$=1) and $K_2$ (right-shift operation by two bit positions if $K_2$=1) define the shift vector for the shift unit SHE3. The value of the control signals $K_1$ and $K_2$, and the multiplication, to be carried out correspondingly, of the shift unit SHE3, can also be seen in Table 3. As is also the case in the previous algorithm, the bit $y_i$ represents the current position. The bits $y_n$, $y_{n+1}$ and $Y_{n+2}$ are next set to 0 (see FIG. 4), and, if the word length n is odd, an additional bit is produced by means of doubling of the multiplier MSB.

TABLE 3

| $H_1$ | $H_2$ | $K_2$ | $K_1$ | Multiplication |
|---|---|---|---|---|
| 0 | 1 | 1 | 1 | PP * 0.125 |
| 1 | 0 | 0 | 1 | PP * 0.5 |
| 0 | 0 | 1 | 0 | PP * 0.25 |
| 1 | 1 | 1 | 0 | PP * 0.25 |

The multiplication takes place as in the modified Booth's algorithm with a constant shift vector (FIG. 2). The multiplicand is first loaded into the register REGX, and the accumulation register ACCU is initialized. Beginning at the LSB side, the 5-bit-long decoding window is laid over the two lowest-valued bits of the multiplier Y (see FIG. 4), and is shifted 2 bit positions to the left after each iteration. The result of the decoding determines the concrete execution of the operations during an iteration. The partial product $PP_i$ is calculated using the variable shift unit SHE3, which allows shifts to the right by 1, 2 or 3 bit positions. After n/2 iterations, the product is available in the accumulation register ACCU. So that no overflow can occur during the execution of the additions or subtractions, the multiplicand X must have a doubled MSB.

The testing of the correctness of Table 2 can be carried out using Table 1. With the logical operation $H_1$ $$H_1 = (y_{i-1} \oplus y_i) \times (y_i \oplus y_{i+1}) \tag{7}$$

it is detected whether a multiplication by 2 needs to be carried out in the original coding according to Table 1, and with the corresponding logical operation $H_2$ $$H_2 = (y_{i+1} \oplus y_{i+2}) \times (y_{i+2} \oplus y_{i+3}) \tag{8}$$

it is detected whether a multiplication by 2 was carried out in the preceding cycle. With the multiplier according to FIG. 3, a multiplication by 2 is realized by an additional right-shift operation of the partial product by one bit position. The partial product must then in the next iteration be shifted to the right not by two but by only one bit position. The described operations can be detected using the logical functions $H_1$ and $H_2$. The control signals $K_1$ and $K_2$ for the shift unit SH3 can be determined therefrom as follows:

$$K_1 = H_1 \oplus H_2 \tag{9}$$

$$K_2 = (\overline{H_1} \times H_2) \tag{10}$$

Since the sign of the multiplicand Y is doubled ($y_0 = y_1$), the condition $H_1$ in the last iteration is never fulfilled, and no additional cycle is required for a further shift operation, so that n/2 shift operations and n/2 additions are also required for the modified Booth's algorithm with variable shift vectors.

The control signals $S_i$ and C can be produced as follows:

$$S_i = y_{i-1} \tag{11}$$

$$C_i = (y_{i-1} \oplus y_i) \times (y_i \times y_{i+1}) \tag{12}$$

Table 2 shows the 5 bits of the multiplier Y acquired by the decoding window, and also the factor signal C and the sign signal S, as well as the results of the operations $H_1$ and $H_2$ or, respectively, $K_1$ and $K_2$. The control signals $K_1$ and $K_2$ are outlined in those cases in which the control signal $K_2$ is binary 1. Table 3 extracts the various cases from Table 2, and indicates which multiplication is to be carried out in the shift unit SHE3. If both the control signal $K_1$ and $K_2$ are binary 1, a multiplication by ⅛ takes place by means of three shift operations to the right.

If the control signal $K_1$ is binary 1 and the control signal $K_2$ is binary 0, then only one shift operation or a multiplication by ½ ensues. If the control signal $K_1$ is binary 0 and the control signal $K_2$ is binary 1, two shift operations or a multiplication by ¼ take place.

Figure 5:
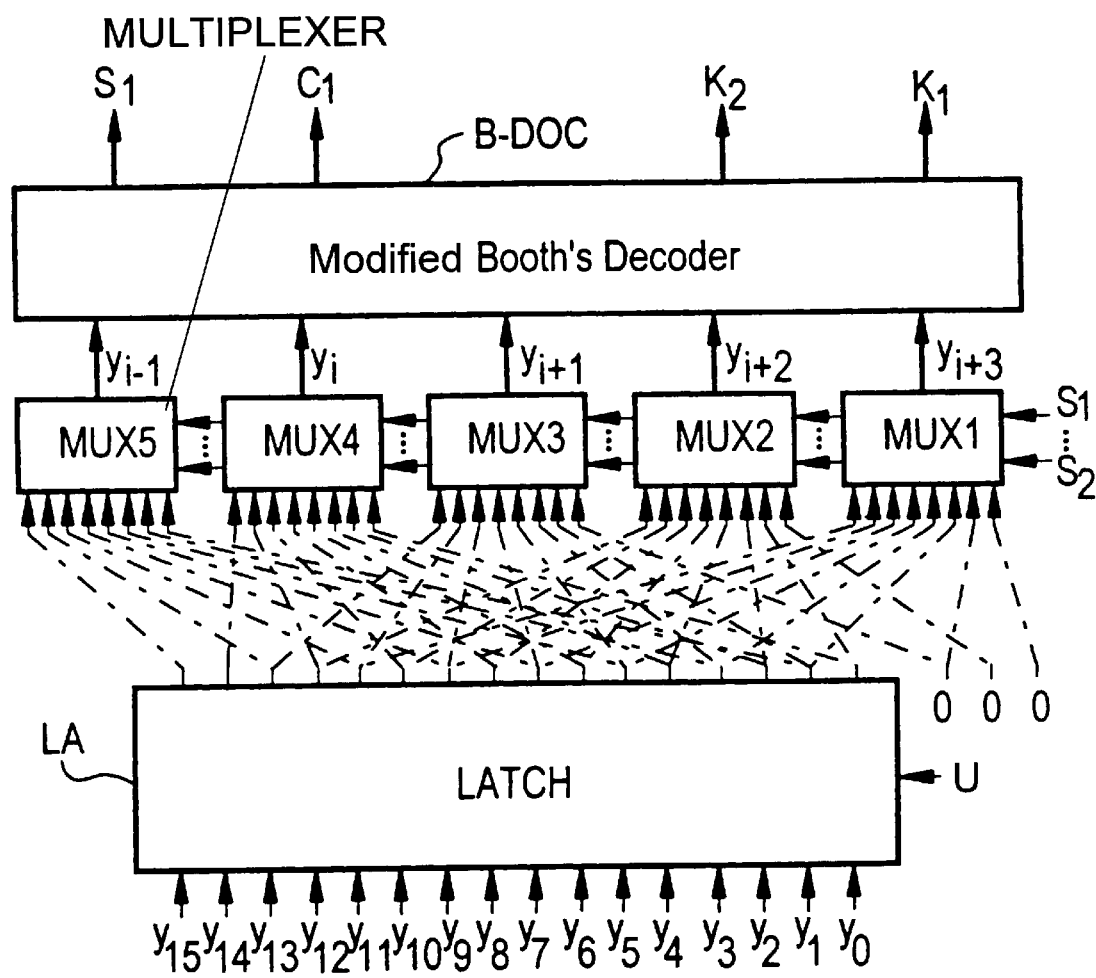
FIG. 5 shows a schematic diagram of the Booth decoding circuit.

FIG. 5 shows the schematic diagram of the Booth decoding circuit DEKOY with a variable shift vector. The multiplier Y is stored in an n-bit long latch memory LA, using the accept signal U. The decoding window function is formed using 5 multiplexers MUX1 to MUX5, each with 8 inputs. The inputs are selected successively by means of the control lines S1 to S8. The control signals $S_i$, C, $K_1$ and $K_2$, corresponding to the equations 7 to 12, are produced from the 5 bits of the current decoding window, using the actual Booth decoder B-DOC.

Figure 6:
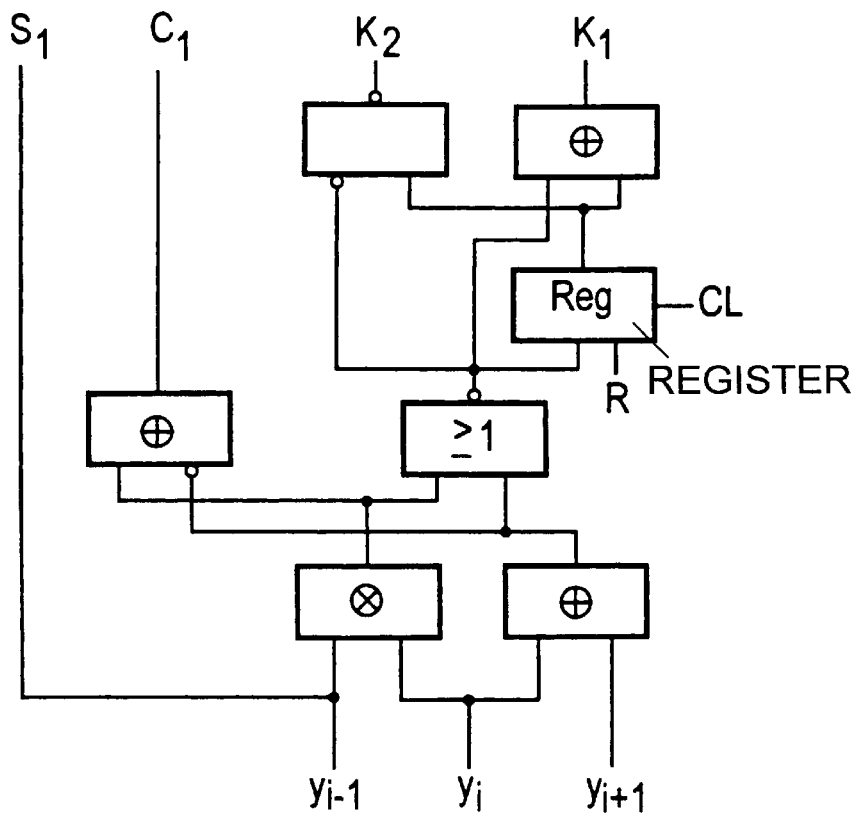
FIG. 6 shows a realization of the Booth decoder.

FIG. 6 shows the schematic diagram of the Booth decoder B-DOC. Since the logical functions $H_1$ and $H_2$ are identical, they can be combined by storing the results from the preceding cycle to form a function as shown in FIG. 6. The result of the function $H_1$ is stored with the accept signal CL in the register REG, and in the next clock period corresponds to the result of the function $H_2$. At the beginning of the Booth decoding, the content of the register is to be set to logical 0. Since the function $H_2$ was the only one that required the signals $y_{i+2}$ and $y_{i+3}$, the multiplexers MUX1 and MUX2 in FIG. 5 can be omitted.

The individual circuits of FIG. 6 are explained by the symbols, which correspond to those of equations 7 to 12. Corresponding circuits are known in the literature.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for a multiplication circuit for multiplying a multiplicand (X) and a multiplier (Y) according to a Booth method in iterative steps, comprising the steps of:

decoding, beginning with the least significant bit, five multiplier bits ($Y_{i-1}$, $Y_i$, $Y_{i+1}$, $Y_{i+2}$, $Y_{i+3}$) in order to obtain a factor signal (c) a sign signal ($S_i$) and two control signals $K_1$,$K_2$), wherein the sign signal (S) is obtained according to the formula:

$$S_i = Y_{i-1},$$

wherein the factor signal (C) is obtained according to the formula:

$$C_i = (y_{i-1} \oplus y_i) \times (y_i \oplus y_{i+1})$$

and wherein the control signals $K_1$, $K_2$ are obtained from the following formulas:

$$H_1 = (y_{i-1} \oplus y_i) \times (y_i \oplus y_{i+1})$$
   $$H_2 = (y_{i+1} \oplus y_{i+2}) \times (y_{i+2} \oplus y_{i+3})$$
   $$K_1 = H_1 \oplus H_2$$
   $$K_2 = \overline{(H_1 \times H_2)}$$

multiplying, in order to obtain a first intermediate e result dependent on the factor signal (C) the multiplicand by one of 0 or 1;

multiplying, in order to obtain a second intermediate result dependent on the two control signals ($K_1$, $K_2$), a previous partial product ($PP_{i+2}$) of the preceding iteration by one of ½, ¼ or ⅛, whereby previously the partial product ($PP_{i+2}$) is initially set to 0;

adding or subtracting, dependent on the sign signal (S), the first intermediate result and the second intermediate result in order to obtain a current partial product ($PP_i$); and shifting a decoding window to the left by two bits via the multiplier (Y) before a next iterative step.

2. A multiplier circuit for multiplication of a multiplicand and a multiplier according to the Booth method in iterative steps, comprising:

a multiplicand register that stores the multiplicand;

a multiplier at an output of the multiplicand register, which multiplier multiplies the multiplicand by one of 0 or 1, dependent on a factor signal;

an arithmetic logic unit, which, dependent on a sign signal, adds or subtracts a result emitted at an output of the multiplier to a second intermediate result present at a further output of the multiplier;

an accumulation register connected to an output of the arithmetic logic unit;

a shift unit connected to an output of the accumulation register, with which a content of the accumulation register is multiplied by one of ½, ¼ or ⅛, dependent on control signals, in order to produce the second intermediate result; and an output of the shift unit connected to the arithmetic logic unit.

3. The multiplier circuit according to claim 2, wherein the multiplier circuit further comprises a decoding circuit for producing the control signals of the factor signal and of the sign signal, the decoding circuit having a latch memory for storing the multiplier, having multiplexers connected to an output of the latch memory, which select at the output of the latch memory bits of a decoding window from the multiplier bits, and having a decoder that produces the control signals from the bits of the decoding window.

4. A multiplier circuit for multiplication of a multiplicand and a multiplier according to the Booth method in iterative steps, comprising:

a multiplicand register that stores the multiplicand;

a multiplier at an output of the multiplicand register, which multiplier multiplies the multiplicand by one of 0 or 1, dependent on a factor signal;

an arithmetic logic unit, which, dependent on a sign signal, adds or subtracts a result emitted at an output of the multiplier to a second intermediate result present at a further output of the multiplier;

an accumulation register connected to an output of the arithmetic logic unit;

a shift unit connected to an output of the accumulation register, with which a content of the accumulation register is multiplied by one of ½, ¼ or ⅛, dependent on control signals, in order to produce the second intermediate result;

an output of the shift unit connected to the arithmetic logic unit; and a decoding circuit for producing the control signals of the factor signal and of the sign signal, the decoding circuit having a latch memory for storing the multiplier, having multiplexers connected to an output of the latch memory, which select at the output of the latch memory bits of a decoding window from the multiplier bits, and having a decoder that produces the control signals from the bits of the decoding window.

\* \* \* \* \*